United States Patent
Maddali et al.

(10) Patent No.: US 8,671,434 B2
(45) Date of Patent: Mar. 11, 2014

(54) METHOD AND APPARATUS FOR SUPPORTING SERVICES VIA A SET-TOP BOX

(75) Inventors: Balamuralidhar Maddali, Chennai (IN); T. Sahaya George, TamilNadu (IN); Sivasankari S. Venkataramamoorthy, Chennai (IN); Varaprasad Meka, Karnataka (IN); Thalha Yasir Refaye, Chennai (IN); RajKumar Panneerselvam, Chennai (IN); Raju Ramakrishnan, Bangalore (IN); Madankanth Lanka, Andhra Pradesh (IN); Naman Patel, Gujarat (IN); Abhishek Malhotra, Saharanpur (IN); Chaitanya Kumar Behara, Andhra Pradesh (IN); Anil Kumar Yanamandra, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 274 days.

(21) Appl. No.: 12/832,451

(22) Filed: Jul. 8, 2010

(65) Prior Publication Data

US 2012/0011553 A1 Jan. 12, 2012

(51) Int. Cl.
*H04N 7/173* (2011.01)
*H04N 7/10* (2006.01)
*H04N 7/16* (2011.01)

(52) U.S. Cl.
USPC .............. 725/106; 725/28; 725/34; 725/116

(58) Field of Classification Search
None
See application file for complete search history.

(56) References Cited

U.S. PATENT DOCUMENTS

| | | | |
|---|---|---|---|
| 2006/0062192 A1* | 3/2006 | Payne, III | 370/338 |
| 2007/0143787 A1* | 6/2007 | Cankaya | 725/34 |
| 2008/0244676 A1* | 10/2008 | DaCosta | 725/116 |
| 2008/0301737 A1* | 12/2008 | Hjelmeland Almas et al. | 725/61 |
| 2009/0089840 A1* | 4/2009 | Shusman | 725/51 |
| 2009/0325609 A1* | 12/2009 | Rosen et al. | 455/466 |
| 2010/0064310 A1* | 3/2010 | Izumi et al. | 725/28 |
| 2010/0242074 A1* | 9/2010 | Rouse et al. | 725/100 |
| 2011/0107238 A1* | 5/2011 | Liu et al. | 715/756 |
| 2011/0273625 A1* | 11/2011 | McMahon et al. | 348/734 |

* cited by examiner

*Primary Examiner* — Oschta Montoya

(57) ABSTRACT

An approach is provided for supporting messaging services via a set-top box. A set-top box establishes communications with a user device. The set-top box receives a message from the user device, and stores the message for inclusion in a messaging log. The set-top box presents content of the messaging log via a display coupled to the set-top box. According to one embodiment, the set-top box receives network address information of the user device, maps the network address information to location information, and retrieves information from a data repository based on the location information. In another embodiment, the user device acquires information about a program being experience by a user via the set-top box, and generates a message to provide presence status information to a social network service based on the program information.

18 Claims, 14 Drawing Sheets

US 8,671,434 B2

METHOD AND APPARATUS FOR SUPPORTING SERVICES VIA A SET-TOP BOX

BACKGROUND INFORMATION

With the convergence of telecommunications and media services, there is increased competition among service providers to offer more services and features to consumers, and concomitantly develop new revenue sources. For instance, traditional telecommunication companies are entering the arena of media services that have been within the exclusive domain of cable (or satellite) television service providers. Television remains the prevalent global medium for entertainment and information. Concurrently, media services have enjoyed great success in other industries, such as portable media devices (e.g., personal digital assistants (PDAs), MP3 players, mobile phones, etc.), audio streaming services, video streaming, etc. Unfortunately, little or no attention has been paid to the integration of the various mediums to support the seamless sharing and experience of media. Traditionally, television service providers have offered limited user interaction with set-top boxes, other than through a conventional infrared remote controller to specify the selection of programs. Moreover, users can be engaged in prevalent onlines activities and services, such as social network sites. However, there has been little or no coordination of the devices that permit participation in these other activities with the set-top boxes. That is, integration of these services have been lacking.

Therefore, there is a need for an approach to provide coordination between media experience over a set-top box and other telecommunications and services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for providing services via set-top boxes are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE). Furthermore, although the STB is explained in the context of call events, it is contemplated that other device events relating to various services and functions are applicable.

Figure 1:
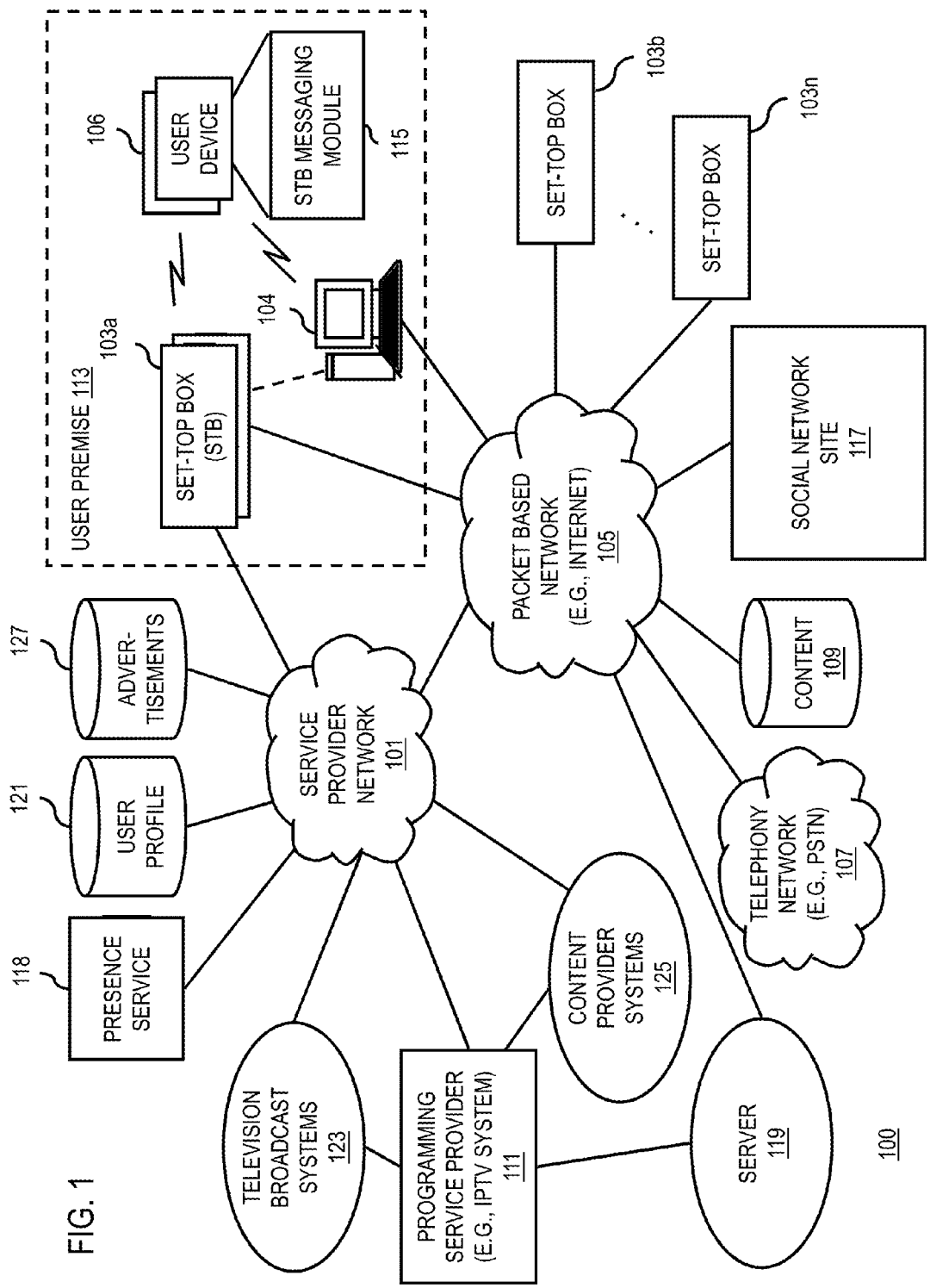
FIG. 1 is a diagram of a system capable of providing messaging, information retrieval, and social network services via a set-top box (STB), according to an exemplary embodiment.

FIG. 1 is a diagram of a system capable of providing messaging, information retrieval, and social network services via a set-top box (STB), according to an exemplary embodiment. It is observed that even with the advent of the Internet and high-speed data connections, television remains the prevalent global medium for entertainment and information. In fact, as traditional television programming (e.g., "over-the-air" programming, cable programming, satellite programming, etc.) merges with the online content (e.g., network-streamed content, on-demand content, Internet programming, media-sharing websites, etc.), the available programming choices are likely to continue to grow without any true bounds. Moreover, it is also recognized that social network services have increased in popularity as the convenience of "staying connected" to family members, friends and colleagues steadily rises. It is further noted that the sharing of opinions, commentary, and recommendations on, for instance, media content are common discussions within the social network sites as well as other web sites that provide web logs (or blogs). However, traditional systems do not provide any convenient interface between services offered through set-top boxes and online services.

Additionally, no such media convergence is available for user devices, which may contain media that the user has created, purchased, or otherwise accumulated. Such problem stems, in part, from the lack of connectivity between the user devices and set-top boxes. Moreover, there has not been any development regarding the protocol mechanisms to facilitate the convenient and efficient transfer of data. With respect to user devices, such as mobile communication devices (particularly those that support both cellular and wireless networking interfaces), these devices are continually available to support voice and data communications. Another area of interest is that of location-based services, whereby knowledge of the devices' location can be utilized to tailor information to the corresponding users. Unfortunately, cellular communications suffers from unreliability when cellular devices are brought indoors, as signal strength can greatly diminish; consequently location of the device is no longer known. System 100 can address this problem by utilizing an approach that circumvents the reliance on cellular interfaces to obtain the position or location of user devices. As mentioned, no coordination between these devices and set-top boxes exists under traditional approaches.

System 100 of FIG. 1 enables user device 106 to generate messages to a set-top box as part of a localized messaging service and/or a social network service. In one embodiment, the user device, e.g., mobile phone, can produce a message from user device 106 via STB messaging module 115. The message can be included in a messaging log maintained by STB 103a. The messaging log can be presented to a display (not shown) that is coupled to STB 103a. According to one embodiment, the set-top box provides information retrieval based on contextual information, such as location. In particular, the set-top box receives network address information of the user device, maps the network address information to location information, and retrieves information from a data repository based on the location information. In another embodiment, the user device acquires information about a program being experience by a user via the set-top box, and generates a message to provide presence status information to a social network service based on the program information.

In certain embodiments, the user device may be any type of computer device or mobile device having the capability to support voice communications via software, firmware, and/or hardware. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

In the example of FIG. 1, service provider network 101 integrates the television medium with that of the telecommunications, computing, and media environments, thereby broadening the scope of devices and sources available to individuals for obtaining programming content or other media. By way of example, service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

STBs 103a-103n and/or terminal 104 can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 103a-103n to various sources of media content. Although depicted in FIG. 1 as separate networks, packet-based network 105 and/or telephony network 107 may be completely or partially contained within service provider network 101. For example, service provider network 101 may include facilities to provide for transport of packet-based and/or telephony communications.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via server 119, as well as available via one or more packet-based networks 105 or telephony networks 107, etc.

STBs 103a-103n may be used alone or in combination with one or more end terminal(s) 104 to implement various exemplary embodiments relating messaging, information retrieval, and social networking services from one or more user devices 106. Under the scenario of FIG. 1, user premise 113 includes these user devices 106 and terminal 104. As shown, user device 106 possesses a STB messaging module 115, which is configured to facilitate user input of messages as part of a messaging log maintained by STB 103a. According to one embodiment, the content of the message log can be supplied automatically to a social network service, e.g., as provided by social network site 117. The social network site 117 can, in certain embodiments, be managed by the service provider, and thus be part of service provider network 101. In this manner, a user via user device 106 can post messages to STB 103a regarding programs that have been or are being viewed by the user. As such, subsequent viewers can readily obtain the opinion of, for example, a household member.

Figure 8:
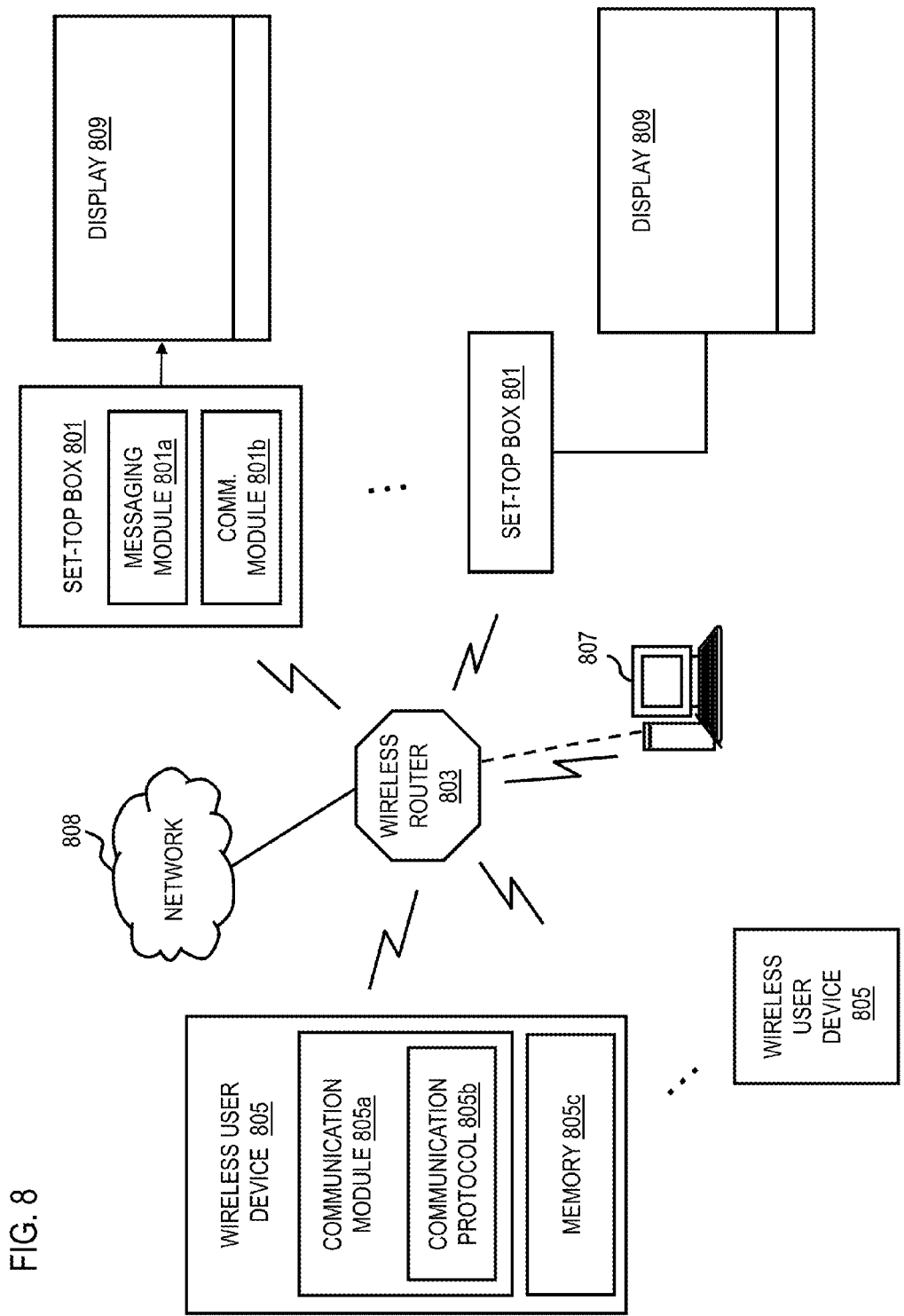
FIG. 8 is a diagram of a wireless environment in which user devices and set-top boxes interact to provide messaging service and/or social network service, according to various embodiments.

Also, it is contemplated that user premise 113 can house multiple STBs (as shown in FIG. 8); under this scenario, messaging module 115 can behave as a notification system for these STBs 103a. For example, if the user is a parent, an announcement can be sent to the displays alerting the family members that it is dinner time, etc.

Moreover, a presence server 118 tracks whether a user via user device 106 is available or "online." In effect, the service provider can provide a community or social network group as its own service, whereby user devices 106 can participate in instant communication sessions (e.g., chat room) to engage in information exchange regarding a particular program, for instance. According to one embodiment, advertisements can be retrieved based on the profiles of the users and the program; in other words, targeted advertisements are enabled by determining information about the users and/or the content of the program. These capabilities are more fully described below in FIG. 6.

As explained later, set-top box 103*a* can wirelessly (e.g., using Wi-Fi) detect presence of terminal 104 (assuming terminal is so configured to communicate wirelessly) and user device 106 in response to a broadcast message. Thereafter, set-top box 103*a* can receive instructions or commands from user device 106, as later explained with respect to FIGS. 2-6, 9, and 11.

By way of example, STB 103*a*-103*n* can remotely access one or more servers (e.g., server 119), via a communication interface (not illustrated), configured to execute one or more applications in support of the messaging, information retrieval, and social networking services engaged in by user device 106 solely or in conjunction with STB 103. Under this arrangement, the messaging and social networking application may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, server 119 can be an "online" system capable of communicating with one or more third-party web servers (not illustrated), content repositories (e.g., repository 109), or equivalent facilities, to provide users various avenues to locate, specify, receive, and/or share programming content that is accessible over a data network (e.g., packet-based network 105). Such content can be the subject of commentary or other information exchanged using STB messaging module 115.

In the example of FIG. 1, STBs 103*a*-103*n* are located at one or more user premises (e.g., user premise 113), and geospatially associated with one or more regions. STBs 103*a*-103*n* may be configured to communicate with and receive signals and/or data streams from a programming service provider 111 (or other transmission facility). These signals include results of applying search or browse operations on the available programming content (e.g., video assets) and related date (e.g., programming guide data, metadata) retrieved over a data network (e.g., service provider network 101, packet-based network 105, and/or telephony network 107), as well as conventional video broadcast content.

In one embodiment, a user profile repository 121 may be employed to maintain subscribers to the device event-based STB control service. User profile repository 121 along with content repository 109, or server 119 may be accessed via one or more service provider networks 101 and/or packet-based networks 105. In one embodiment, the user profile repository 121 stores user settings, preferences, configuration information for the service, as well as account information to messaging and social network services. Further, service provider network 101 may include a system administrator (not shown) for operational and management functions to deploy the virtual channel service using, for instance, an internet protocol television (IPTV) system. In this manner, STBs 103*a*-103*n* can utilize any suitable technology to draw, receive, and/or transmit media content from/to a programming service provider 111 or other content source/sink. A more detailed explanation of an exemplary STB is provided with respect to FIG. 7.

In an exemplary embodiment, STBs 103*a*-103*n* can draw, receive, and/or transmit programming guide information and related content from (or to) multiple sources, thereby alleviating the burden on any single source, e.g., programming service provider 111, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 103*a*-103*n* either apart from, or in conjunction with, programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, service provider network 101 may include one or more video and/or audio processing modules (not shown) for acquiring and transmitting programming guide information and related content feeds (including content accessible over a data network) from programming service provider 111, the television broadcast systems 123, the third-party content provider systems 125, or servers 119 over one or more of the networks 101, 105, 107, to particular STBs 103*a*-103*n*. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Moreover, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 103*a*-103*n* and the content sources may be established directly or through the programming service provider 111.

In other embodiments, authentication procedures on a first device (e.g., STB 103*a*) may identify and authenticate a second device (e.g., terminal 104) communicatively coupled to, or associated with, the first device. Further, the authentication module may grant users the right to receive programming guide information and related content from multiple system 100 sources by revoking existing sets of digital certificates associated with a particular provider, and issuing new sets of digital certificates mapped to a second provider. In this regard, an STB (e.g., STB 103a) may receive new programming content or guide information from a second source, whereas the previous session may be automatically closed when the "old" or prior certificates associated with the first source are revoked. This enables users to initiate secure sessions at any given STB 103a-103n (or end terminal 104) linked to system 100, whether or not the STB (or end terminal) belongs to that individual user. It is additionally contemplated that multiple rights sessions may exist concurrently.

In particular embodiments, programming service provider 111 may comprise an IPTV system configured to support the transmission of television video programs from the broadcast systems 123 as well as other content, such as content from the various third-party sources (e.g., 109, 119, 123, 125) utilizing internet protocol (IP). That is, the IPTV system 111 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 103a) may integrate all the functions of an IPTV system, as well as combine the programming content and video asset management functions of the various online or off-line environments. For example, it is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 107. While system 100 is illustrated in FIG. 1, the exemplary components are not intended to be limiting, and indeed, additional or alternative components and/or implementations may be utilized.

Service provider network 101, as shown, can further enable the delivery of advertisements as stored in database 127 (or at a third party repository) to a user community formed via set-top boxes 103a-103n. As mentioned, this community can be defined as a social network at a local level (within the system of network service provider) or a universal level (including systems external to service provider network 101).

Upon establishment of communications between the user device 106 and set-top box 103a, various services can be offered to the user, ranging from messaging to social networking, as next described in FIGS. 2-6.

Figure 2:
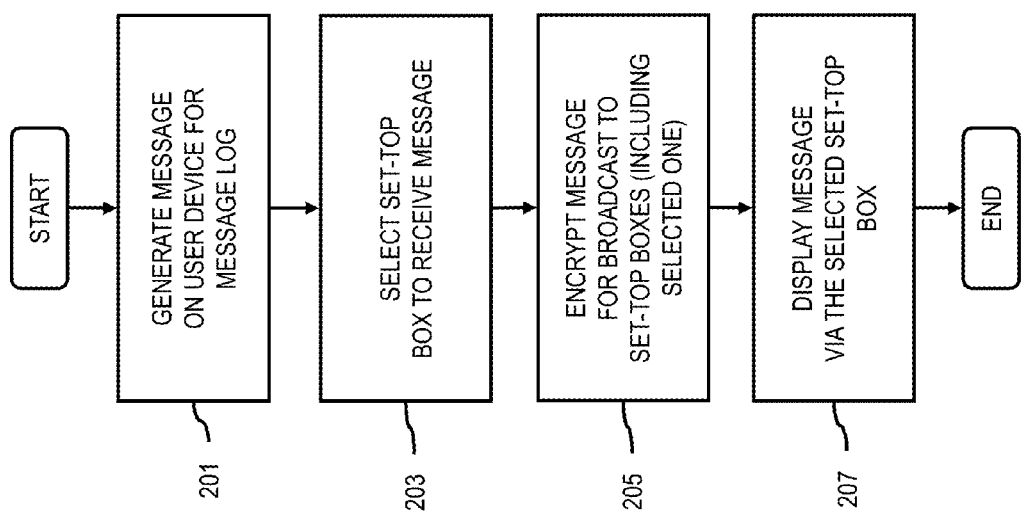
FIG. 2 is a flowchart of a process for generating messages for presentation via a set-top box, according to an exemplary embodiment.

FIG. 2 is a flowchart of a process for generating messages for presentation via a set-top box, according to an exemplary embodiment. Continuing with the example of FIG. 1, set-top box 103a first detects a wireless device (e.g., user device 106) according to a predetermined communication protocol. According to one embodiment, this protocol is a Simple and Extensible Transmission Protocol (SETP) and can be used to enable communication between two devices. The communication can involve in sending commands, data and events. SETP provides device detection and bonding as well as handling of command messages and data messages. Details of SETP are more fully described with respect to FIGS. 9-11. Advantageously, the protocol is designed to be simple, as to accommodate the constraints associated with portable (or mobile) devices; such devices are typically constrained by battery life and processing power.

For this scenario, it is assumed that user premise 113 employs multiple set-top boxes 103a, which can interact with one or more user devices 106 (e.g., mobile phone). In one embodiment, mobile phone 106 possesses wireless communication interfaces, such as a cellular interface as well as a Wi-Fi interface (not shown). Such scenario is useful when a user wishes to forward a message to one or more of the set-top boxes 103a, effectively acting as a notification system to all users who are engaged in viewing certain content.

User device 106 executes an application on the device 106, which prompts the user for input. In response to the input, a command (or message) is generated by user device 106, per step 201. Thereafter, the user, via the application, selects one or more destination set-top boxes 103a, as in step 203. This command can be sent over any transport that supports broadcasting. As noted, the content message may be encrypted if required. In step 205, the message, which may include any combination of text, audio, or video content, is encrypted and broadcasted to all set-top boxes 103a. The intended recipient one or more set-top boxes 103a then presents, per step 207, the message on corresponding displays (not shown).

By way of example, the command from user device 106 has the following format, per Table 1:

TABLE 1

| Description | Name | Length | Value |
|---|---|---|---|
| Count (No of people in the broadcast list) | 22 | 1 | Number of people this message is intended. |
| Algorithm | 4 | 1 | '0' represents the message is unencrypted. |
| Content | 2 | Length of the value | Encrypted Message content |
| To Info | 25 | Length of the value | To info |
| ... | | | |

The above process can be utilized to maintain a message log for user devices 106. In this manner, users can provide a running commentary on various subjects relating to the programs offered by the particular STB 103a. It is contemplated that STB 103a, in conjunction with user device 106, can categorize message logs, which may then be optionally supplied to a social network site of the user.

Figure 3:
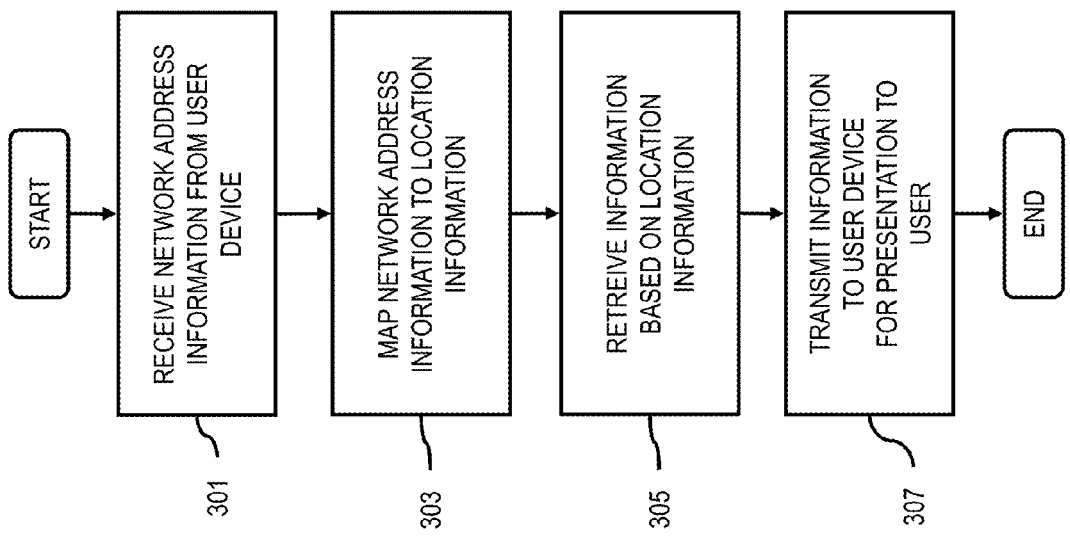
FIG. 3 is a flowchart of a process for acquiring information via a set-top box based on location of a user device, according to an exemplary embodiment.

FIG. 3 is a flowchart of a process for acquiring information via a set-top box based on location of a user device, according to an exemplary embodiment. In step 301, user device 106 communicates network address information, e.g., MAC address, to STB 103a. This network address information can then be mapped to location information, as in step 303, by using data from user profile 121, for example. That is, the user profile 121 can specify a table of MAC addresses associated with a particular account (which would specify postal address information, for example). Next, information, as found in data repository such as content database 109 (which, e.g., may be a data server), can be retrieved based on the location information, per step 305. Such context information can, for example, be used to retrieve weather information that is relevant to that determined location of user device 106. In step 307, the information is forwarded to user device 106 via STB 103a for presentation to the user.

Figure 4:
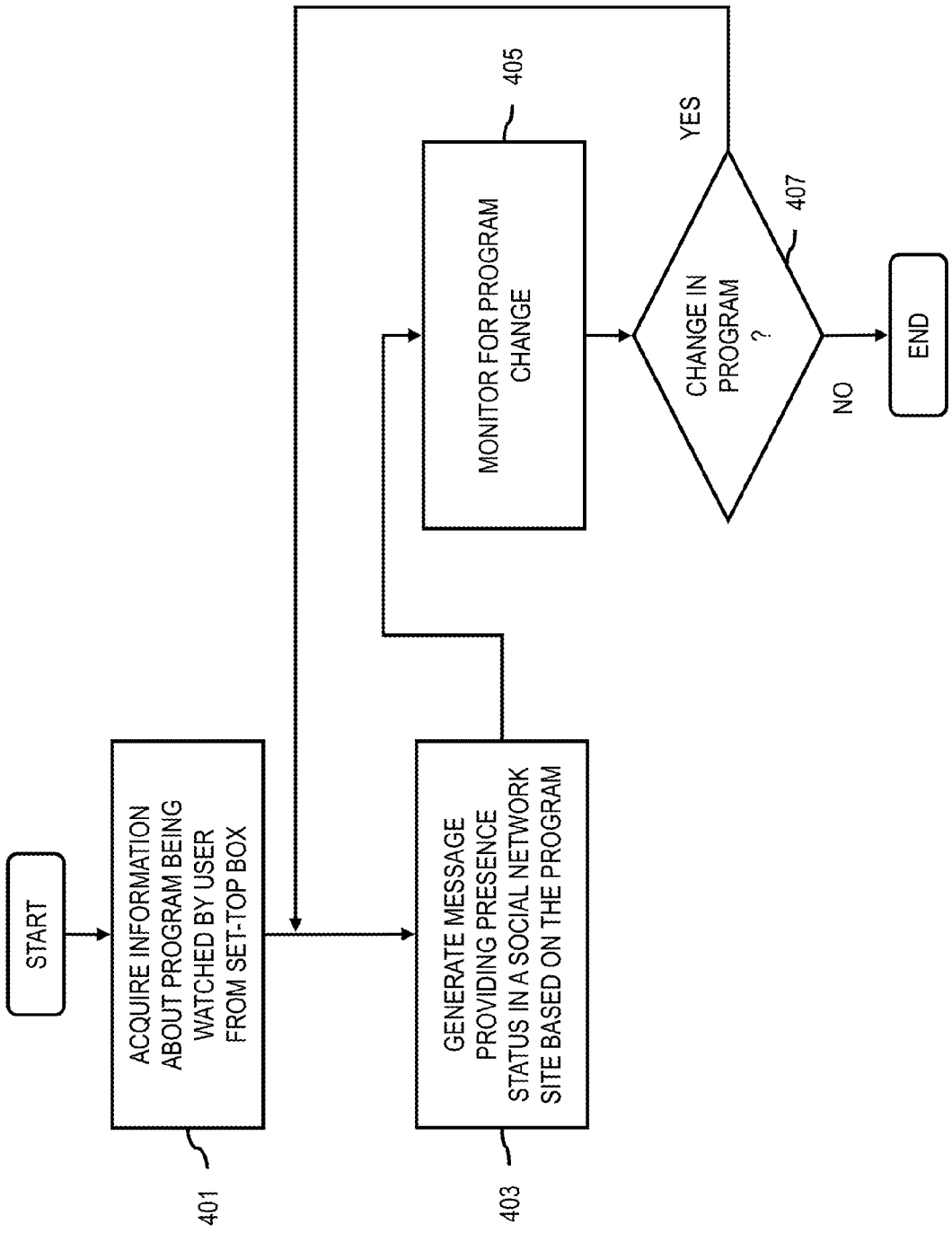
FIG. 4 is a flowchart of a process for updating status information for a social network service using a set-top box, according to an exemplary embodiment.

FIG. 4 is a flowchart of a process for updating status information for a social network service using a set-top box, according to an exemplary embodiment. This process integrates the viewing experience of a user with that of a key function of social network services—i.e., updating user status. In step 401, the process acquires information about the program that is being watched by a user. For example, a user selects a program on STB 103a, which registers this program consumption and generates a message to provide presence status in social network site 117 based on the program. In this manner, the user need not manually use terminal 104 to logon the social network site 117 to type the user's status: "watching tennis match." Instead, STB 103a executes a social network module (not shown) to communicate that fact that the user is currently viewing a tennis match with social network site 117. Upon posting this status, "friends" of the user can gain knowledge of the user's present activity and even comment on the match.

According to one embodiment, the process continually monitors whether there is a change in the program being viewed by the user, as in step 405. If the user changes (as in step 407) the program from the tennis match to a movie on another channel, this status is noted per step 403. Otherwise, no status change is performed.

The above process, in certain embodiments, can be performed using Simple and Extensible Transmission Protocol (SETP), as next illustrated. SETP is a binary protocol that is used as the controller of the event delivery protocol. SETP with the minimal functionality can be used as the controlling channel for GEDP. In certain embodiments, GEDP supports data delivery across the controller devices and the consoles. The initial detection, handshaking and authorization are also handled by the SETP. However the requirement of the SETP as controlling protocol need only be optional. SETP is more fully described below with respect to FIGS. 10 and 11. In certain embodiments, this protocol can operate with the Transmission Control Protocol (TCP) and User Datagram Protocol (UDP).

Figure 5:
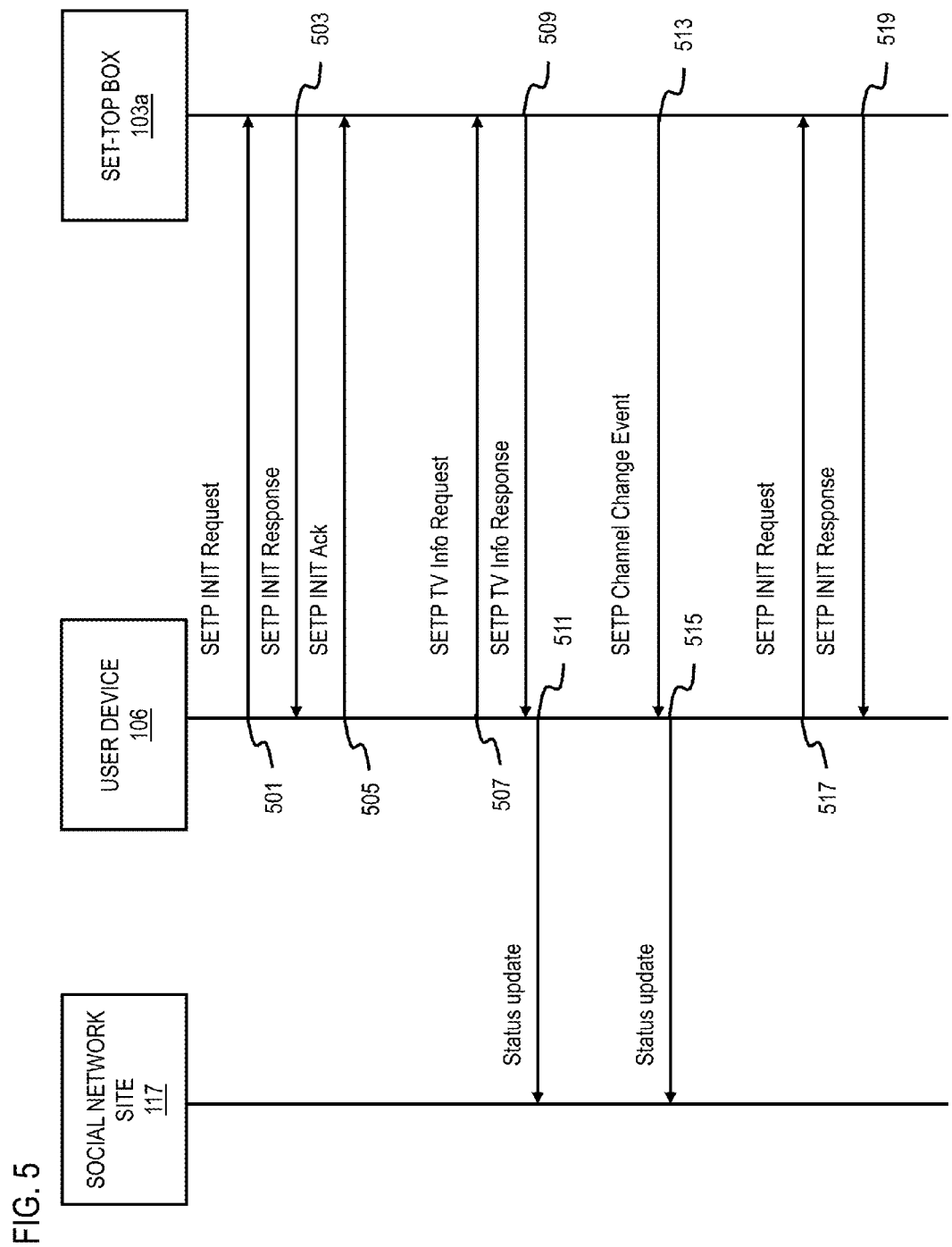
FIG. 5 is a ladder diagram of the process of FIG. 4 performed using a communications protocol that supports interaction between a user device and a set-top box, according to an exemplary embodiment.

FIG. 5 is a ladder diagram of the process of FIG. 4 performed using a communications protocol that supports interaction between a user device and a set-top box, according to an exemplary embodiment. First, user device 106 and STB 103a undergoes a handshake process, as in steps 501-503. Specifically, a Request message is generated by user device 106 and forwarded to STB 103a, which then replies with Response message, per steps 501 and 503. In step 505, user device 106 submits an Acknowledgement (Ack) message to STB 103a. At this point, a communication channel is established between user device 106 and STB 103a.

In step 507, a TV Information Request message is generated by user device 106 to inquire what program is being viewed by STB 103a. In turn, STB 103a determines the channel selection information and generates a Response message indicating such information (steps 507 and 509). In step 511, user device 106 extracts the program information and creates an appropriate Status Update message that is compatible with social network site 117.

In step 513, STB 103a determines that the user changes the program, and thus, produces a Channel Change Event message to indicate detection of a program change. This Channel Change Event message is sent to user device 106, which again creates a Status Update message, per step 515, for forwarding to social network site 117.

Next, the communication session between user device 106 and STB 103a can terminate with the following exchange. In step 517, user device 106 generates a Request message to terminate the communication session. Upon receiving this Request message, STB 103a can then generate a Response message to acknowledge the termination of the communication (step 519).

In addition to the described process for updating status information as part of a social network service, a process for establishing a chat group of users who are experiencing the same program can be dynamically established, as explained below with respect to FIG. 6.

Figure 6:
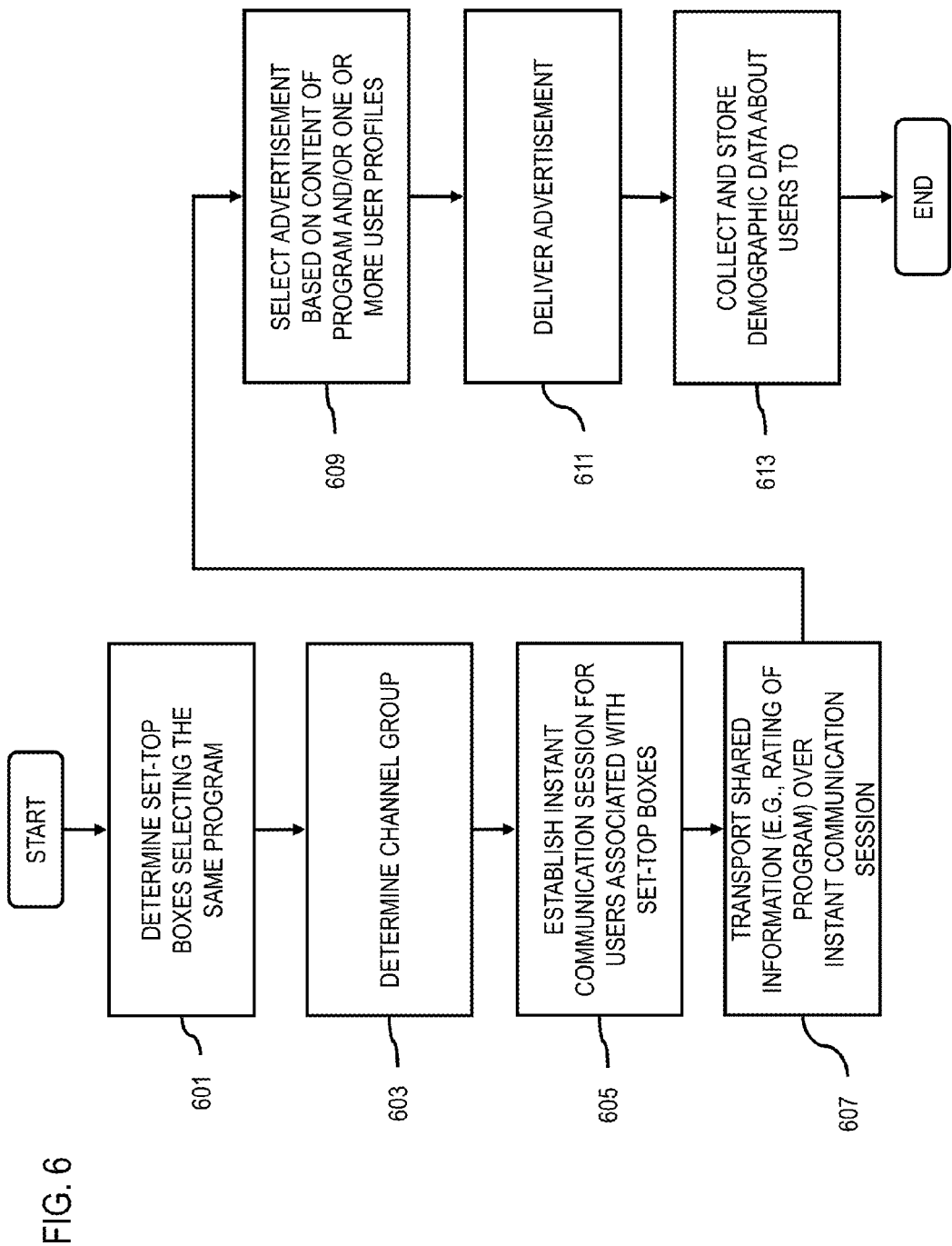
FIG. 6 is a flowchart of a process for establishing an instant communication session based on a channel group, according to an exemplary embodiment.

FIG. 6 is a flowchart of a process for establishing an instant communication session based on a channel group, according to an exemplary embodiment. For the purposes of illustration, this process is described with respect to a multiple STB scenario. In step 601, the process determines which STBs 103a are viewing a common program, and establishes a group of users for this program/channel (step 603). To enable these users to convey their thoughts about the commonly viewed program, an instant communication session (e.g., instant messaging or chat room) is established for these users, as in step 605. If a chat room is provided, users can dynamically elect to enter and drop out of the session. In step 607, the users can share information about the program or channel being viewed. By way of example, this information is used to provide rating of the program being watched. Additionally, users can "vote" on certain aspects of the program.

The process provides the capability to send targeted advertisements to users who are tuned to that channel or to a program. Accordingly, in step 609, advertisement is selected from advertisement database 127 using one or more criteria. For instance, content of the program can be utilized to determine the targeted advertisements. Additionally, user profile information can also be factored into the selection of the advertisements. The selected advertisement is then delivered to the users, for example, via the chat room (per step 611).

Furthermore, demographic data can be collected and stored (as in step 613) about the particular users participating in the chat and supplied to, for example, a third party content provider. The specific data can be obtained directly from user profile database 121. It is noted that this disclosure of user information can be negotiated with the users as part of the registration process to the social network service.

Figure 7:
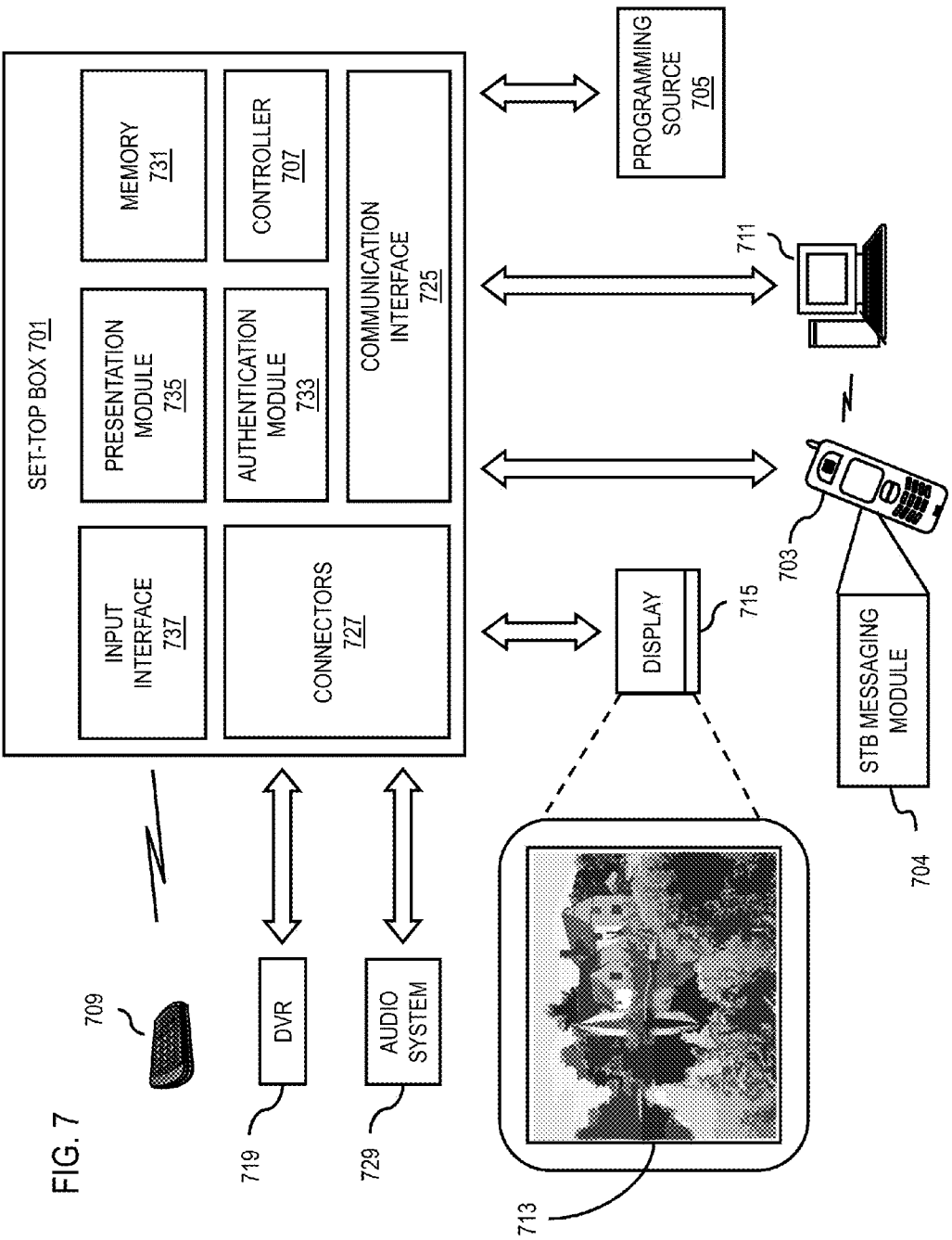
FIG. 7 is a diagram of a set-top box providing messaging services, according to an exemplary embodiment.

FIG. 7 is a diagram of a set-top box providing messaging services, according to an exemplary embodiment. STB 701 may utilize any suitable technology to receive media from user device 703 (e.g., mobile phone), as well as one or more content streams from a programming source 705, such as the IPTV system of FIG. 1. In this example, user device 703 includes an STB messaging module 704 to generate and forward messages to other users.

STB 701 may comprise computing hardware (such as described with respect to FIG. 12) and include additional components configured to provide services related to processing call event driven. In addition, STB 701 includes hardware and/or other components to support related functions and capabilities for providing messaging and social network functions. As shown in FIG. 7, the functions and operations of STB 701 may be governed by a controller 707, which performs the reception and forwarding of messages from one or more STB messaging modules 704 (of which one is shown).

Additionally, controller 707 interacts with each of the STB components to provide programming guide information and related content retrieved from an audio or video-sharing site, as well as from another STB device or component of system 100. In turn, the user may be afforded greater functionality utilizing a control device 709 to control the personalized programming guide service and related services, as will be more fully described below. As later explained, remote control functions can also be provided by mobile phone 703.

STB 701 may be configured to communicate with a number of user devices, including: a PC 711, laptops, PDAs, cellular phones (e.g., device 703), mobile devices, handheld devices, as well as any other equivalent technology capable of capturing and storing media. According to another embodiment, computer 711, as a user device, can also be configured with a slideshow module 711*a* to transfer media 711*b* to STB 701 for presentation to display 715.

As such, STB 701 may be configured to provide an indicator that the STB 701 is being controlled by the mobile unit 703 on (or at) display 715. In one embodiment, presentation of the media (or content) may include: displaying, recording, playing, rewinding, forwarding, toggling, selecting, zooming, or any other processing technique that enables users to manipulate the media. For instance, STB 701 may provide one or more signals to the display 715 (e.g., television) so that the display 715 may present the media, as images, audio, video, or any combination thereof. A communication interface (not illustrated) of PC 711 may be configured to retrieve the programming and content information over the data network (e.g., packet-based network 105), wherein STB 701 may receive a programming content stream from PC 711 to present to the user via display 715.

STB 701 may also interact with a PVR, such as digital video recorder (DVR) 719, to store received content that can then be manipulated by a user at a later point in time. In various embodiments, DVR 719 may be network-based, e.g., included as a part of the service provider network 101, collocated at a subscriber site having connectivity to STB 701, and/or integrated into STB 701.

Furthermore, STB 701 may include a communication interface 725 configured to receive content streams from the programming service provider 111, PC 711, server (not shown), or other programming content source, such as media source 703. Communication interface 725 may optionally include single or multiple port interfaces. For example, STB 701 may establish a broadband connection to multiple sources transmitting content to STB 701 via a single port, whereas in alternative embodiments, multiple ports may be assigned to the one or more sources. In still other embodiments, communication interface 725 may be configured to permit users, via STB 701, to transmit data (including media content) to other users with STBs, a programming service provider 111, or other content source/sink.

According to various embodiments, STB 701 may also include inputs/outputs (e.g., connectors 727) to display 715 and DVR 719, as well as an audio system 729. In particular, audio system 729 may comprise a conventional audio-video receiver capable of monaural or stereo sound, as well as multichannel surround sound. Audio system 729 may include speakers, ear buds, headphones, or any other suitable component configured for personal or public dissemination. As such, STB 701, display 715, DVR 719, and audio system 729, for example, may support high resolution audio and/or video streams, such as high definition television (HDTV) or digital theater systems high definition (DTS-HD) audio. Thus, STB 701 may be configured to encapsulate data into a proper format with required credentials before transmitting onto one or more of the networks of FIG. 1 and de-encapsulate incoming traffic to dispatch data to display 715 and/or audio system 729.

In an exemplary embodiment, display 715 and/or audio system 729 may be configured with internet protocol (IP) capability (i.e., includes an IP stack, or is otherwise network addressable), such that the functions of STB 701 may be assumed by display 715 and/or audio system 729. In this manner, an IP ready, HDTV display or DTS-HD audio system may be directly connected to one or more service provider networks 101, packet-based networks 105, and/or telephony networks 107. Although STB 701, display 715, DVR 719, and audio system 729 are shown separately, it is contemplated that these components may be integrated into a single component, or other combination of components.

Authentication module 733 with STB 701 may also be responsible for detecting and authenticating one or more user devices 703. Additionally, authentication module 733 may be provided to initiate or respond to authentication schemes of, for instance, service provider network 101 or various other content providers, e.g., broadcast television systems 123, third-party content provider systems 125, or servers 119. Authentication module 733 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 701 may identify and authenticate a second device (e.g., PC 711) communicatively coupled to, or associated with, STB 701, or vice versa. Further, authentication information may be stored locally at memory 731, in a repository (not shown) connected to STB 701, or at a remote repository, e.g., user profile repository 121.

Authentication module 733 may also facilitate the reception of data from single or disparate sources. For instance, STB 701 may receive broadcast video from a first source (e.g., IPTV system 111), signals from a second source (e.g., server 119), and a programming content stream from a third source accessible over a data network (e.g., content repository 109). As such, display 715 may present the broadcast video and programming content stream to the user. This presentation may be experienced separately, concurrently, in a toggled fashion, or with zooming, maximizing, minimizing, or trick capabilities, or equivalent mode.

Connector(s) 727 may provide various physical interfaces to display 715, audio system 729, as well as other peripherals; the physical interfaces may include, for example, RJ45, RJ11, high definition multimedia interface (HDMI), optical, coax, FireWire, wireless, and universal serial bus (USB), or any other suitable connector. The presentation module 735 may also interact with a control device 709 for determining particular media content that a user desires to experience. In an exemplary embodiment, the control device 709 may comprise a remote control (or other access device having control capability, such as a PC 711, wireless device, mobile phone, etc.) that provides a user with the ability to readily manipulate and dynamically change parameters affecting the device event-based STB control service. In other examples, STB 701 may be configured for voice recognition such that STB 701 may be controlled with spoken utterances.

In addition to the user device 703 being configured to control the manner in which STB 701 behaves in response to device events, STB 701 may also permit control device 709 to activate and deactivate the device event-based STB control service. In this manner, control device 709 may include (not shown) a cursor controller, trackball, touch screen, touch pad, keyboard, and/or a key pad for activating a messaging application, selecting programming content, as well as performing other control functions. Control device 709 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 709 may comprise a memory (not illustrated) for storing preferences relating the device event-based STB control service; such preferences can be conveyed to STB 701 through an input interface 737. The input interface 737 may support any type of wired and/or wireless link, e.g., infrared, radio frequency (RF), BLUETOOTH™, and the like. Thus, control device 709 may store user preferences with respect to the parameters associated with the device event-based STB control service. Alternatively, user preferences may be tracked, recorded, or stored in STB 701 or in a network user profile repository 121. The preferences may be automatically retrieved and activated by a user at any time. It is noted that the control device 709 may be separate from STB 701 or may be integrated within STB 701 (in which case certain input interface hardware and/or software may not be necessary).

Particular embodiments enable users, via control device 709, to populate or otherwise configure a user profile. For instance, a user profile application may be provided or accessed by STB 701 to enable users to populate a plurality of entry fields with user information. A user profile may include one or more customized or personalized settings relating to the slideshow application, as well as other content and applications. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible programming content sources/subjects, a "blacklist" specifying one or more programming content sources/subjects, as well as other equivalent customized settings, such as color schemes, sound effects, etc.

Thus, under the above arrangements of FIG. 7, a mobile phone 703 can conveniently generate establish communications and generate messages for distribution among users defined as a group within, for example, a social network.

FIG. 8 is a diagram of a wireless environment in which user devices and set-top boxes interact to provide messaging service and/or social network service, according to various embodiments. In this example, one or more STBs 801 operates within a wireless local area network (LAN) through the use of a wireless router 803, using Wi-Fi. The router 803 provides connectivity among multiple wireless user devices 805a-805n (e.g., mobile phone with Wi-Fi capability, PDA, etc.) and a computer device 807. Also, wireless router 803 links to an external data network 808—e.g., service provider network or global Internet.

This arrangement can enable use of mobile phone, for example, as control devices for the computer 807 and set-top box 801. Such an environment can support devices that are Wi-Fi enabled; alternatively, wired connections can be utilized—e.g., an Ethernet cable from computer device 807 to router 803, either directly or through another network component such as a hub.

STB 801 includes a device event module 801a configured to operate with a communication module 801b to permit wireless user device 805 and computer device 807 to process control signals related to device events, such as sensor events. As shown, STB 801 outputs to a display 809. In one embodiment, messaging module 801a receives commands or messages from wireless user device 805; as explained, the messages are generated for presentation to other users. Although not shown, terminal 807 may also include a STB messaging module for generating messages to STB 801 for display to users. The authorization procedure is more fully described with respect to FIGS. 9A-9C.

Additionally, user device 805 includes a communication module 805a (executing a communication protocol 805b), and memory 805d configured to store instructions for the communication protocol 805b.

To coordinate the processing of sensor events, user device 805 and STB 801 employ communication protocol 805b to create a communication channel for transport of data messages as well as command (or control) messages. As mentioned, the communication protocol can utilize transport protocols, such as Transmission Control Protocol (TCP) or User Datagram Protocol (UDP) over Internet Protocol (IP).

Figure 9A:
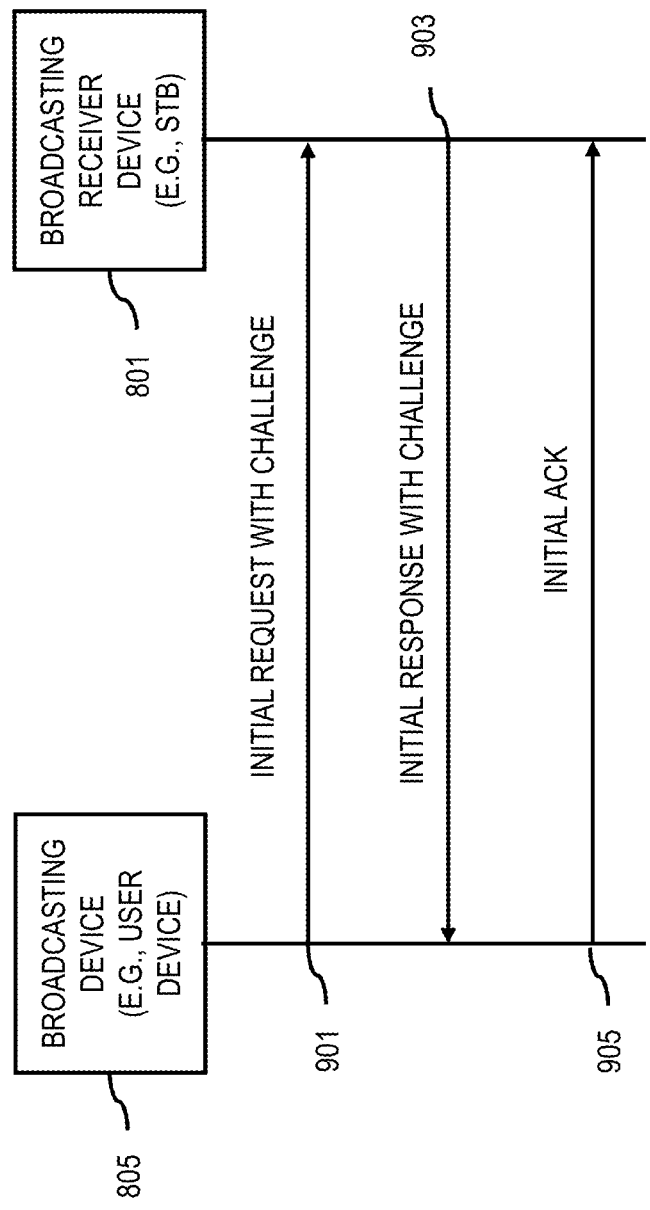
FIGS. 9A-9C are flowcharts of processes for establishing communication between a user device and a set-top box, according to various embodiments.
Figure 9B:
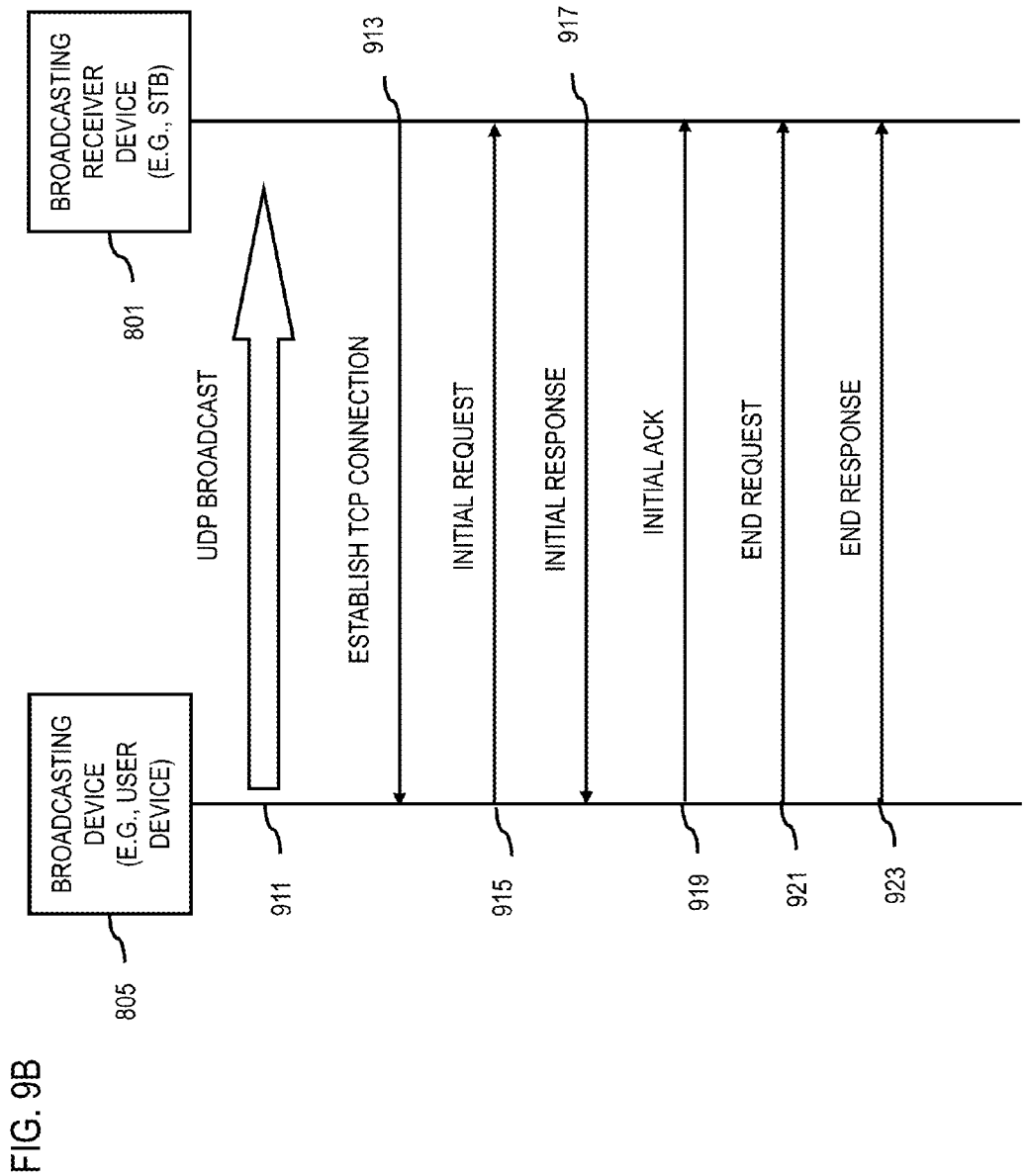
Figure 9C:
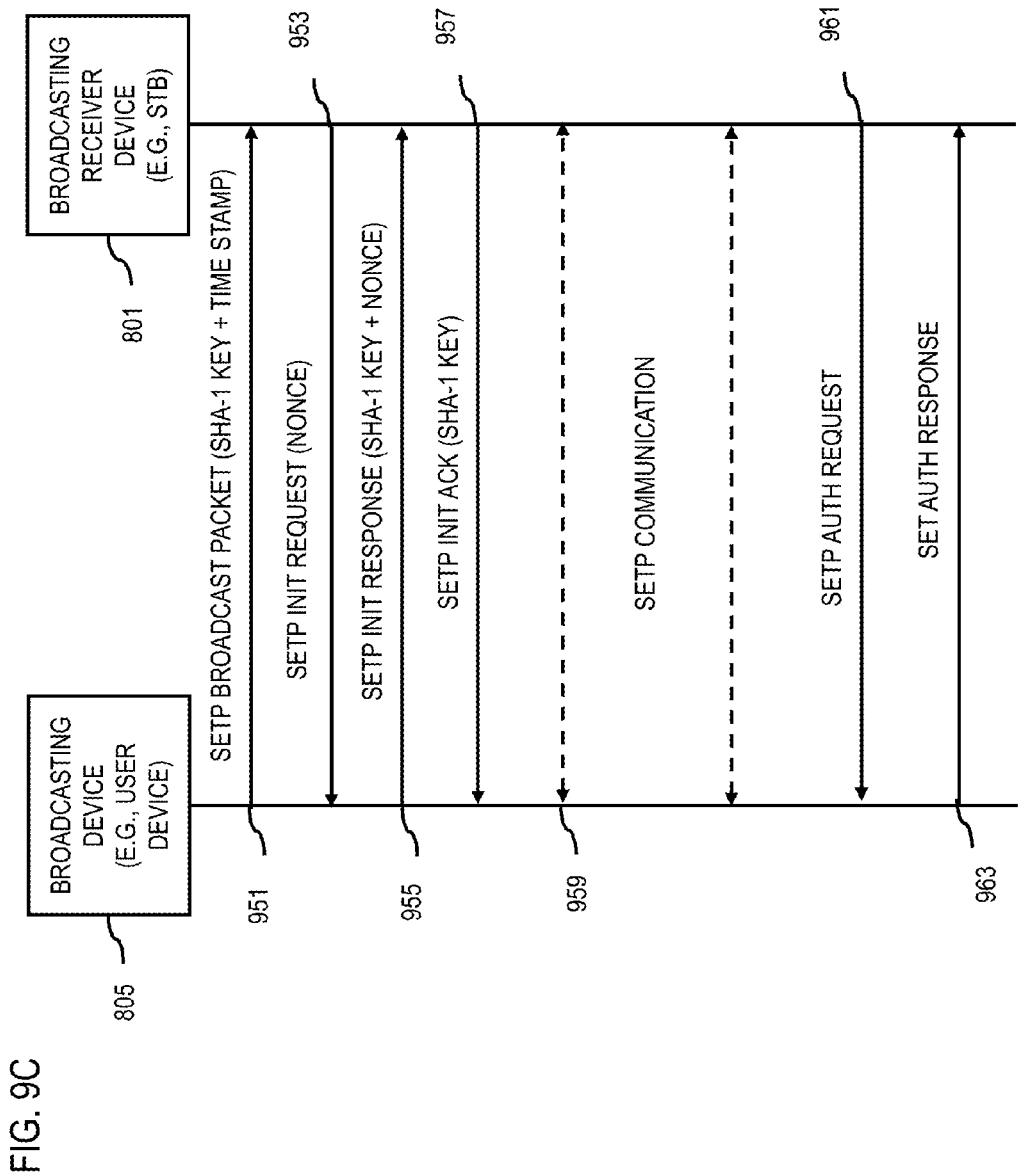

FIGS. 9A-9C are flowcharts of processes for establishing communication between a user device and a set-top box, according to various embodiments. By way of example, these processes associated with SETP 801 are explained with respect to the system of FIG. 8, wherein communication is established between a user device 805 and set-top box 801.

FIG. 9A shows a ladder diagram of a handshaking mechanism that is supported by SETP 801. In this example, user device 605 and STB 601 are assigned a User ID and password (or passcode); the assignment of these credentials can be managed by a service provider according to one embodiment. Under this scenario, the devices 801, 805 can communicate if both of their credentials are same. In this manner, it would be apparent that the user is common to user device 805 and STB 801. According to certain embodiments, a key is generated from the User ID and password (e.g., a personal identification number (PIN)) will be sent as part of broadcast packets. Under this arrangement, there is flexibility for interested devices to establish a communication channel with the broadcasting device.

As shown, user device 805 is referred to as a "broadcasting device," while STB 801 is the "broadcasting receiver device." For instance, when the broadcast receiver 801 decides to communicate with the broadcasting device 805, the receiver 801 establishes a communication channel (e.g., TCP session or channel) with the broadcasting device 805. If the connection is not authenticated using, for example, an initial hand shaking within a predetermined period (e.g., 120 seconds) of the connection being opened, the connection is closed. When the connection is accepted by device 805, device 805 challenges with the initial hand shaking request. Thus, in step 901, user device 805 generates a request with challenge for transmission to STB 801. In turn, the broadcasting receiver device 801 can submit a response along with the challenge, per step 903. Upon receiving the response, device 805 can send an acknowledgement message (ACK) to positively indicate successful receipt of the response (step 905). Once this procedure is completed, the session is secured. The challenge response can be used as the Session ID for the entire session.

In one embodiment, the common (or least) capabilities transmitted during the above hand shaking negotiation process can be used as the session capability for the whole session. If the session capability rules are violated by any command, such rules can be responded with a "Not Supported" response.

According to certain embodiments, all the further communications between device 801 and device 805 will be conducted over this TCP channel in the case of TCP transport. If the TCP connection is broken, the described authentication procedure is performed again for the new communication channel. That is, on successful handshake, both the originator and terminator devices can maintain the TCP channel for the whole session. This TCP channel can be closed and opened at any point of time during the communication. Each re-opening of communication channel requires the described handshaking mechanism to be performed for the authentication. The command and data packets (which were described above) can be sent through this established channel. The connection will be closed if the authentication or authorization fails. Also, an established communication channel can be closed by sending a session close command; however, closing the TCP channel can also terminate this session.

FIG. 9B shows a process for detecting a user device, according to one embodiment. In step 911, user device 805 generates a message, e.g., UDP broadcast message, for transmission to STB 801. SETP 801, in certain embodiments, provides for binding and listening on predetermined port for both the TCP and UDP packets. The device that does not want to be detected need not start a UDP server. Similarly in the case in which a device does not want to support the detection mechanism (and only wants to be an originator all the time), such device also need not start the TCP server. If a device wants to support the detection mechanism (and only wants to be the terminator), the particular device need not start the TCP server, but needs to start the UDP server.

The terminator (STB 801 in this example) can listen on the same port for both the TCP and UDP packets. When an originating device wants to detect other SETP responders, such device generates the UDP broadcasting packets. Upon detection of this broadcast message, STB 801 initiates establishment of a TCP connection (per step 913), using the handshaking procedure of FIG. 9A (as in steps 915-919). Hence, by receiving this broadcasting packet, the receiving device 801 (terminator) can establish a TCP communication channel with device 805.

In this example, user device 805 submits an End Request message to STB 801, per step 921. Also, user device 805 sends an End Response message, as in step 923, to STB 801.

FIG. 9C illustrates a signaling flow for authenticating a user device using SETP 801, according to one embodiment. This example addresses how SETP 801 ensures session security and data security. In certain embodiments, the SHA family of algorithms (SHA-1) is employed by SETP 801 for the encryption. As seen, an initial "SETP BROADCAST" packet is sent, per step 951, by user device 805. The BROADCAST packet carries a SHA-1 key and a nonce value as its payload. The SHA-1 key is generated using the combination of the User ID, password and the nonce value (time stamp generated during the packet generation). For example, if the User ID is "51234567890", the password is "ABCD" and the time stamp is "987654321", the combined string "51234567890ABCD987654321" is formed. The resultant string is used as an input to generate the SHA-1 key.

The terminating device, STB 801, receives this BROADCAST packet and extracts the SHA key and the nonce value. Since STB 801 also is aware of the User ID and password, STB 801 generates the SHA key using the nonce value (extracted from the BROADCAST packet) sent by the originator. If the resultant SHA key generated by the terminator is the same as the one received from the originator 805, a TCP communication channel can be established with originator, user device 805.

In step 953, STB 801 accepts the TCP connection, and challenges user device 805 with the SETP INIT REQUEST. This request, for example, includes a nonce value as a payload. Once device 805 receives this INIT REQUEST, device 805 generates the SHA key using the User ID, password and the nonce value (received from the terminator 801). User device 805 challenges STB 801 with a nonce value and with the SHA key through the SETP INIT RESPONSE, per step 955.

When STB 801 receives this INIT RESPONSE, STB 801 extracts the nonce value and the SHA from the INIT RESPONSE. STB 801 then responds to the challenge by generating the SHA key and sends the key through the SETP INIT ACK, per step 957.

As both STB 801 and user device 805 successfully responded to the challenges, now they are paired and can communicate. According to one embodiment, to ensure the communication channel is secure, set-top box 805 can periodically challenge user device 805 through a SETP AUTH REQUEST and appropriate SET AUTH RESPONSE (steps 961 and 963). If any of the entity fails to respond the challenges successfully, the communication channel will be closed.

The described processes and arrangement advantageously enables automatic control of set-top boxes in response to device events experienced by a user device, e.g., mobile phone. In certain embodiments, the communication between the user device and STB is facilitated by a simple and extensible transmission protocol.

Figure 10A:
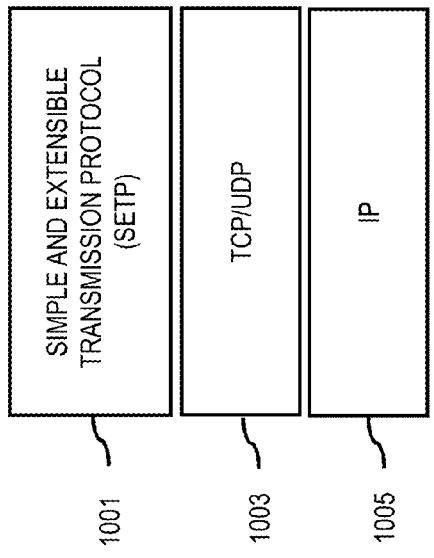
FIGS. 10A and 10B are diagrams of a communication protocol and associated messaging formats for controlling STB applications based on sensor events, according to various embodiments.
Figure 10B:
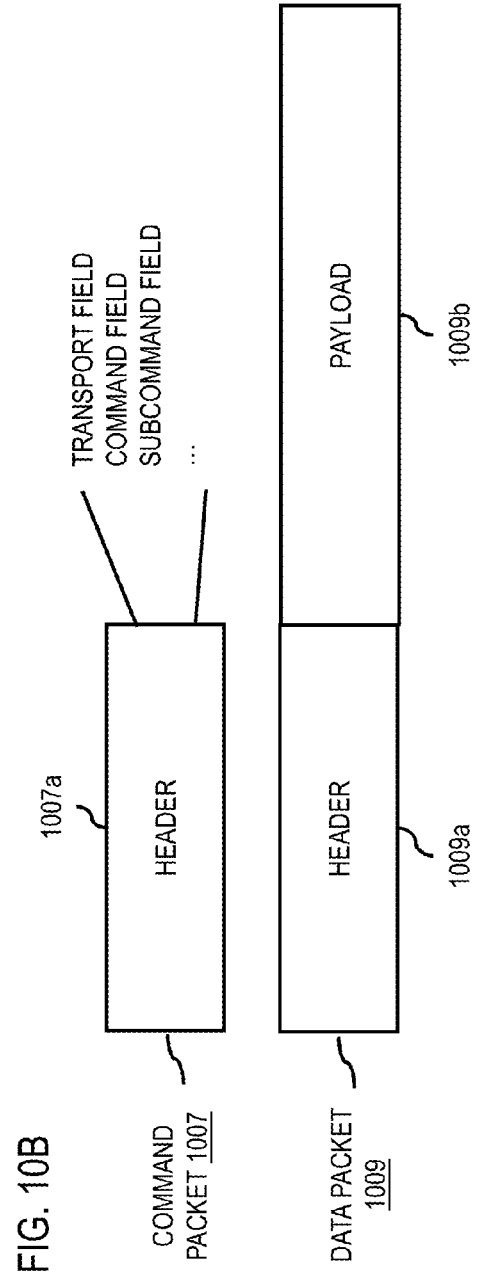

FIGS. 10A and 10B are diagrams of a communication protocol and associated messaging formats for controlling STB applications based on sensor events, according to various embodiments. As shown in FIG. 10A, in certain embodiments, a Simple and Extensible Transmission Protocol (SETP) 1001 rests above a Transmission Control Protocol (TCP) or User Datagram Protocol (UDP) layer 1003. Also, the Internet Protocol (IP) 1005 can be utilized. These protocols 1001-1005 can configured to operate in a variety of wireless transport environments. For the purposes of illustration, the SETP 1001 is explained with respect to a Wi-Fi environment.

In one embodiment, SETP 1001 is a binary protocol that resides within the application layer (of the Open System Interconnect (OSI) model). SETP 1001 can be used to send various commands and command related information along with command data. SETP 1001 utilizes predefined command headers, thereby advantageously requiring less processing time. Also, this protocol is efficient as the commands are pre defined and the decoding can be simple. Further, SETP 1001 is fast, in that the processing of the commands follow different logical branches for different commands.

As mentioned, SETP 1001 can be configured to support different transport mechanisms. For instance, the addition of new transport mechanisms and associated commands can be readily accommodated. The commands and data to be transferred are secure in that SETP 1001 is session based. Accordingly, passwords are never "sent out through wire"; consequently, the password need not be changed frequently.

SETP 1001 can be used to build different applications. Although SETP 1001 is primarily described herein for the communication between STBs and user devices, SETP 1001 can also be used to communicate between any other applications/devices/PCs to transfer commands and data.

As depicted in FIG. 10B, a command message (or referred to as command packet in the case of IP) 1007 includes only a header. A data message (data packet) includes a header 1009a and a payload 1009b.

The SETP header structure 1009a includes 70 bytes. This header is used to carry all the commands, data and events. Table 2 below enumerates the fields in the header, according to certain embodiments.

TABLE 2

| |
|---|
| Protocol ID (1 Unsigned Byte) |
| Protocol Version (1 Unsigned Byte) |
| Protocol Subversion (1 Unsigned Byte) |
| Transport (1 Unsigned Byte) |
| Command (2 Unsigned Bytes) |
| Command Sequence (1 Unsigned Byte) |
| Time stamp (4 Unsigned Byte) |
| Proxy Info (6 Unsigned Byte) |
| From Info (6 Unsigned Byte) |
| To Info (6 Unsigned Byte) |
| Auth Info (32 Unsigned Byte) |
| Sub Command (1 Unsigned Byte) |
| Flags (2 Unsigned Bytes) |
| Reserved (2 Unsigned Byte) |
| Payload Length (4 Unsigned Byte) |

The Protocol Identifier (ID) field identifies the particular message or packet. For example, the Protocol Identifier can be defined as 'V' such that all packets associated with this protocol should have the ID as 'V'. Also, a Protocol Version field can be provided to denote the major version of the protocol. This major version can be changed either for a major functionality change or if the protocol subversion reaches a predetermined limit. The Protocol Subversion field specifies the sub version of the protocol. For every new addition, alteration and modification of this draft requires either this field's increment or the version field's increment.

Transport field denotes the transport mechanism used by the protocol to communicate with other devices, as SETP is designed to accommodate different transports; e.g., TCP over Wi-Fi, and the UDP over the Wi-Fi (the values are specified in Table 3):

TABLE 3

| |
|---|
| SETP_TRANSPORT_WIFITCP = 1 |
| SETP_TRANSPORT_WIFIUDP = 2 |

A Command field identifies the command carried by the protocol. Also, a Command Sequence field denotes the sequence number of the packet sent. For instance, the sequence can start from 0 to 255. Once the value reaches 255, the sequence of the next packet will be 1. By way of example, the sequence number is zero for new commands. This sequence increases if a command/data packet sends its continuation packet.

A Time Stamp field specifies the timestamp of the packet generated. This field can be based on GMT (Greenwich Mean Time) time zone. In one embodiment, for the continuation packets, the timestamp can be the same as the initial packet. The Time Stamp field can be used to combine the divided data packets of the same command.

A Proxy Info field specifies the IP address of the proxy. For the protocol supported in this version, this field is set as the IP address of the endpoint device. This field is particularly useful when TCP and UDP are employed.

A From Info field has the IP address of the packet originator. Also, a To Info field is provided to specify the information of the destination.

An Auth Info field indicates the Session ID established through the initial hand shaking.

A Sub Command field is provide to specify any additional information about the command. The values of this Sub Command field can be interpreted differently for different commands.

SETP 1001 also provides fields for flags, which can include two bytes to be used to specify the bit level information about the packet. The defined bit values are given below in Table 3:

TABLE 3

| Bit Position (From most significant bit) | Description if set |
|---|---|
| 1 | Denotes Originator |
| 2 | It has the continuing packets |
| 3 | It is the continuing packet |
| 4 | If this command is the proprietary |
| 5 | If this device starts the TCP channel first |
| 6 | Denotes big endian |

A Reserved field is provided for future development.

A Payload Length field indicates the length of the payload of the command packet. If this field is zero, for instance, the packet is recognized as a command packet 1007. If this field is not zero and carries some information, this packet is recognized as a data packet 1009. If stream oriented protocols are used as the transport, the next immediate length bytes are read and appended as the payload of this packet. There need not be any constraint on format or the manner in which the payload is manipulated and handled. However, the payload data can be specified in the name, length and value pair, for example. In this manner, SETP 1001 can accommodate different proprietary headers and different objects at the same time.

Regarding command packets and data packets (shown in FIG. 10B), as mentioned, packets that have only headers are defined as command packets. If the packet has both the header and payload data, these packets are designated as data packets. According to some embodiments, the payload of the data packets follow the NLV (Name, Length and Value order) structure. Table 4 lists exemplary header names and codes:

TABLE 4

| Name value (1 unsigned byte) | Description |
|---|---|
| 0 | End indicator |
| 1 | Contains "Name" |
| 2 | Type |
| 3 | Content or data |
| 4 | Algorithm |
| 5 | Nonce key |
| 6 | Key Limit |
| 7 | Key |
| 8 | IP |
| 9 | Port |
| 10 | Transport |
| 11 | Session support |

TABLE 4-continued

| Name value (1 unsigned byte) | Description |
|---|---|
| 12 | Transport Support |
| 13 | Media Support |
| 14 | Length Support |
| 15 | Session Init Time |
| 16 | Session Validity |
| 17 | Max payload support |
| 18 | Binary data model (Big/Little endian) |
| 19 | ID |
| 20 | Size |
| 21 | MAC |

Table 5 provides common subcommands in the responses:

TABLE 5

| Sub Command | Description |
|---|---|
| 1 | OK |
| 2 | NOT_AUTHORIZED |
| 3 | NOT_AUTHENTICATED |
| 4 | FILETYPE_NOT_SUPPORTED |
| 5 | VERSION_NOT_SUPPORTED |
| 6 | TRANSPORT_NOT_SUPPORTED |
| 7 | GENERAL_ERROR |
| 8 | ERROR_PROCESSING_REQUEST |
| 9 | COMMAND_NOT_SUPPORTED |
| 10 | SUBCOMMAND_NOT_SUPPORTED |
| 11 | NOT_AVAILABLE |
| 12 | INVALID_HEADER |
| 13 | INVALID_PAYLOAD |

By way of example, the commands that are supported by SETP 1001 fall into two categories: (1) authenticated commands, and (2) unauthenticated commands. The authenticated commands are the commands can be used only after the authentication, while the unauthenticated commands can be used in both authenticated and unauthenticated sessions.

In addition, SETP 1001 utilizes a Broadcast field to specify broadcasting commands: SETP_COMMAND_BROADCAST=1.

Regarding the payload 1009b, a payload that is sent during the initial handshaking negotiation is denoted as "the resource capability payload." In certain embodiments, there are nine headers that are defined in this payload. These headers are followed in the name, length and value combination, as shown in Table 6.

TABLE 6

| Description | Name (1 Unsigned Byte) | Length (2 unsigned Bytes) | Value |
|---|---|---|---|
| Binary Data Model(1 - Little Endian 2 - Big Endian) | 18 | 1 | 2 |
| Algorithm (Any SHA family algorithms can be used) | 4 | 1 | 1 (denotes SHA-1) |
| Nonce value | 5 | 1 | 0 (use the time stamp from the command header) |
| Key Limit (To denote the range of keys sent from the keys generated) | 6 | 4 | First 2 bytes denotes "starts from". Second 2 bytes denotes "ends with". 0 for the first byte and 31 for the second byte |

TABLE 6-continued

| Description | Name (1 Unsigned Byte) | Length (2 unsigned Bytes) | Value |
|---|---|---|---|
| Key (It combines the "user id + password + nonce" and makes it as a single string. Then the SHA-1 algorithm will be applied to this header to get the 32 bit key. This key will be sent in this field.) | 7 | 32 | Holds the key generated |
| IP | 8 | 6 bytes | 0 (Means the IP will be taken from the IP packet's header) |
| Port | 9 | 2 | Port Number |
| Transport Preference | 10 | 1 | 1 (to denote the TCP over Wi-Fi preference for the communication) |
| Display Name | 1 | Length of the "display name" | Optional Display name (Ex, "SoftRemote") |

In SETP 1001, an Init Session command is used for authorization, and specifies a payload according to the cababllities that are supported. This Init Session command requires a response, which in turn, requires an acknowledgement (INIT ACK). If the validation fails, the connection is closed. The values of the command are as follows in Table 7:

TABLE 7

SETP_COMMAND_INITREQUEST = 3
SETP_COMMAND_INITRESPONSE = 4

For example, in the INIT ACK, the command is '4' and the sub command is '1'. The payload is defined according to Table 8:

TABLE 8

| Description | Name (1 Unsigned Byte) | Length (2 unsigned Bytes) | Value |
|---|---|---|---|
| Binary Data Model | 18 | 1 | 2 |
| Display Name | 1 | Length of the name value | |
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |
| Session support | 11 | 4 | |
| Transport Support | 12 | 2 | |

TABLE 8-continued

| Description | Name (1 Unsigned Byte) | Length (2 unsigned Bytes) | Value |
|---|---|---|---|
| Media Support | 13 | 4 | |
| Length Support | 14 | 4 | |
| Session Init Time | 15 | 6 | |
| Session Validity | 16 | 4 | Validity time in sec. (Once this validation time is over, it can challenge the other end using the 'Authenticate request') |
| Max Payload Support | 17 | 4 | |

SETP 1001 also defines an End Session command, which is used to close/stop the session (e.g., SETP_COMMAND_ENDREQUEST=5). The response is not mandatory for this command.

Further, a Cancel Transfer command is provided for aborting a file transfer. No subcommand or payload is needed. An example of such command is as follows: SETP_COMMAND_CANCELTRANSFERREQUEST=11.

A Channel Change Command relates to changing a channel. This command, according to one embodiment, as an associated response; an example is as follows: SETP_COMMAND_CHANNELCHANGEREQUEST=17. If the requested channel is not found, the response can indicate a sub command of '11'. An exemplary payload is provided below in Table 9:

TABLE 9

| Description | Name (1 Unsigned Byte) | Length (2 unsigned Bytes) | Value |
|---|---|---|---|
| Channel ID | 19 | 4 | |
| Channel Name | 1 | Length of Name | |

A File Display Command is supplied to send a file for display by the receiver. This command has an associated response, which indicates status of the file display. The payload, as detailed in Table 10, can be sent in multiple packets, whereby all the continuation packets only have the File content NLV. Such command is as follows: SETP_COMMAND_FILEDISPLAYREQUEST=19.

TABLE 10

| Description | Name | Length | Value |
|---|---|---|---|
| File Name | 1 | Length of the file name given in the value | Actual file name |
| File Type | 2 | 2 | File type in the bit representation |
| File Size | 20 | 4 | Total file size |
| File Content | 3 | Length of the content | Content of the file |

SETP 1001 also provides a GTP Payload command, which is used to transfer the GTP content. In one embodiment, a response is mandatory for this command (e.g., SETP_COMMAND_GTPREQUEST=21). Table 11 enumerates the sub commands:

TABLE 11

ERROR = 0
CATG_REQ = 1
CATG_RES = 2
CH_REQ = 3
CH_RES = 4
PI_REQ = 5
PI_RES = 6
PD_REQ = 7
PD_RES = 8

A Search Command accommodates a generalized search; such command is as follows: SETP_COMMAND_SEARCHREQUEST=23. Table 12 shows the associated sub commands.

TABLE 12

SEARCH_START = 1
SEARCH_STOP = 2
SEARCH_KEYDATA = 3
SEARCH_DATA = 4
SEARCH_RESET = 5

To initiate a search, a 'search start' command is sent. Each and every key that is input is transmitted as key data. Also, a 'search stop' command specified to end the search. Table 13 provides an exemplary payload:

TABLE 13

| Description | Name | Length | Value |
|---|---|---|---|
| Data | 3 | Length of the data in case of 'data'. '1' in case of the 'key data'. | value to be searched. |

A General Response command is provided to alert the other device about some general predefined responses. No payload need be specified. This command (e.g., SETP_COMMAND_GENERALRESPONSE=25) can be sent as a response for any request. Table 14 lists the sub commands:

TABLE 14

OK = 1
NOT_AUTHORIZED = 2
NOT_AUTHENTICATED = 3
FILETYPE_NOT_SUPPORTED = 4
VERSION_NOT_SUPPORTED = 5
TRANSPORT_NOT_SUPPORTED = 6
GENERAL_ERROR = 7
ERROR_PROCESSING_REQUEST = 8
COMMAND_NOT_SUPPORTED = 9
SUBCOMMAND_NOT_SUPPORTED = 10
NOT_AVAILABLE = 11

An Authenticate Request command permits the other device to authenticate itself (for the nonce value provided by the device). This request has a response; if the response is not proper, the session is closed. The latest key generated will be used as the Session ID for the remaining session. The command and response are as follows:

TABLE 15

SETP_COMMAND_AUTHENTICATEREQUEST = 27
SETP_COMMAND_AUTHENTICATERESPONSE = 28

The payload is listed in Table 16:

TABLE 16

| Description | Name | Length | Value |
|---|---|---|---|
| Algorithm (1 - SHA-1) | 4 | 1 | 1 |
| Nonce key | 5 | 1 | 0 (use the time stamp from the command header) |
| Key Limit | 6 | 4 | First 2 bytes denotes "starts from". Second 2 bytes denotes "ends with". 0 for the first byte and 31 for the second byte |
| Generated Key (This NLV is send only with the hand shaking response and acknowledgement) | 7 | 32 | |

A Remote Control Command is provided for sending the remote control keys to the receiving side. A response this type of command is not needed. An example of the Remote Control Command is SETP_COMMAND_REMOTECONTROLREQUEST=29. Table 17 shows the sub commands:

TABLE 17

```
RC_KEY_POWER = 0
RC_KEY_MUTE = 1
RC_DEVICEKEY_STB = 2
RC_DEVICEKEY_AUX = 3
RC_DEVICEKEY_DVD = 4
RC_DEVICEKEY_TV = 5
RC_KEY_MENU = 6
RC_KEY_GUIDE = 7
RC_KEY_INFO = 8
RC_CONTROL_UP = 9
RC_CONTROL_DOWN = 10
RC_CONTROL_LEFT = 11
RC_CONTROL_RIGHT = 12
RC_CONTROL_OK = 13
RC_KEY_EXIT = 14
RC_KEY_OPTIONS = 15
RC_KEY_WIDGETS = 16
RC_KEY_ONDEMAND = 16
RC_KEY_FAVOURITES = 17
RC_KEY_JUMP = 18
RC_KEY_FIOSTV = 19
RC_KEY_CHANNELUP = 20
RC_KEY_CHANNELDOWN = 21
RC_KEY_VOLUMEUP = 22
RC_KEY_VOLUMEDOWN = 23
RC_KEY_SKIPBACK = 24
RC_KEY_SKIPFORWARD = 25
RC_KEY_DVR = 26
RC_KEY_PLAY = 27
RC_KEY_STOP = 28
RC_KEY_PAUSE = 29
RC_KEY_FORWARD = 30
RC_KEY_BACKWARD = 31
RC_KEY_REC = 32
RC_KEY_1 = 33
RC_KEY_2 = 34
RC_KEY_3 = 35
RC_KEY_4 = 36
RC_KEY_5 = 37
RC_KEY_6 = 38
RC_KEY_7 = 39
```

TABLE 17-continued

```
RC_KEY_8 = 40
RC_KEY_9 = 41
RC_KEY_0 = 42
RC_KEY_ASTERISK = 43
RC_KEY_HASH = 44
RC_CONTROLKEY_A = 45
RC_CONTROLKEY_B = 46
RC_CONTROLKEY_C = 47
RC_CONTROLKEY_D = 48
RC_KEY_INPUT = 49
RC_KEY_PIP = 50
RC_KEY_PIPCHANGE = 51
```

A Device Info Request command permits the sending (or source) device a way to obtain device information of the receiving device (or destination).

Table 18 lists the commands:

TABLE 18

```
SETP_COMMAND_DEVICEINFOREQUEST = 33
SETP_COMMAND_DEVICEINFORESPONSE = 34
```

Table 19 lists the associated payload.

TABLE 19

| Description | Name | Length | Value |
|---|---|---|---|
| Display Name | 1 | Length of the Name | |
| MAC Address | 21 | 6 | |

The described processes and arrangement advantageously enables users to conveniently convey messages via STBs from the users' devices, to retrieve information using location context information, and to interface with social network services. In certain embodiments, the communication between the user device and STB is facilitated by a simple and extensible transmission protocol.

The processes described herein for supporting services via a set-top box may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
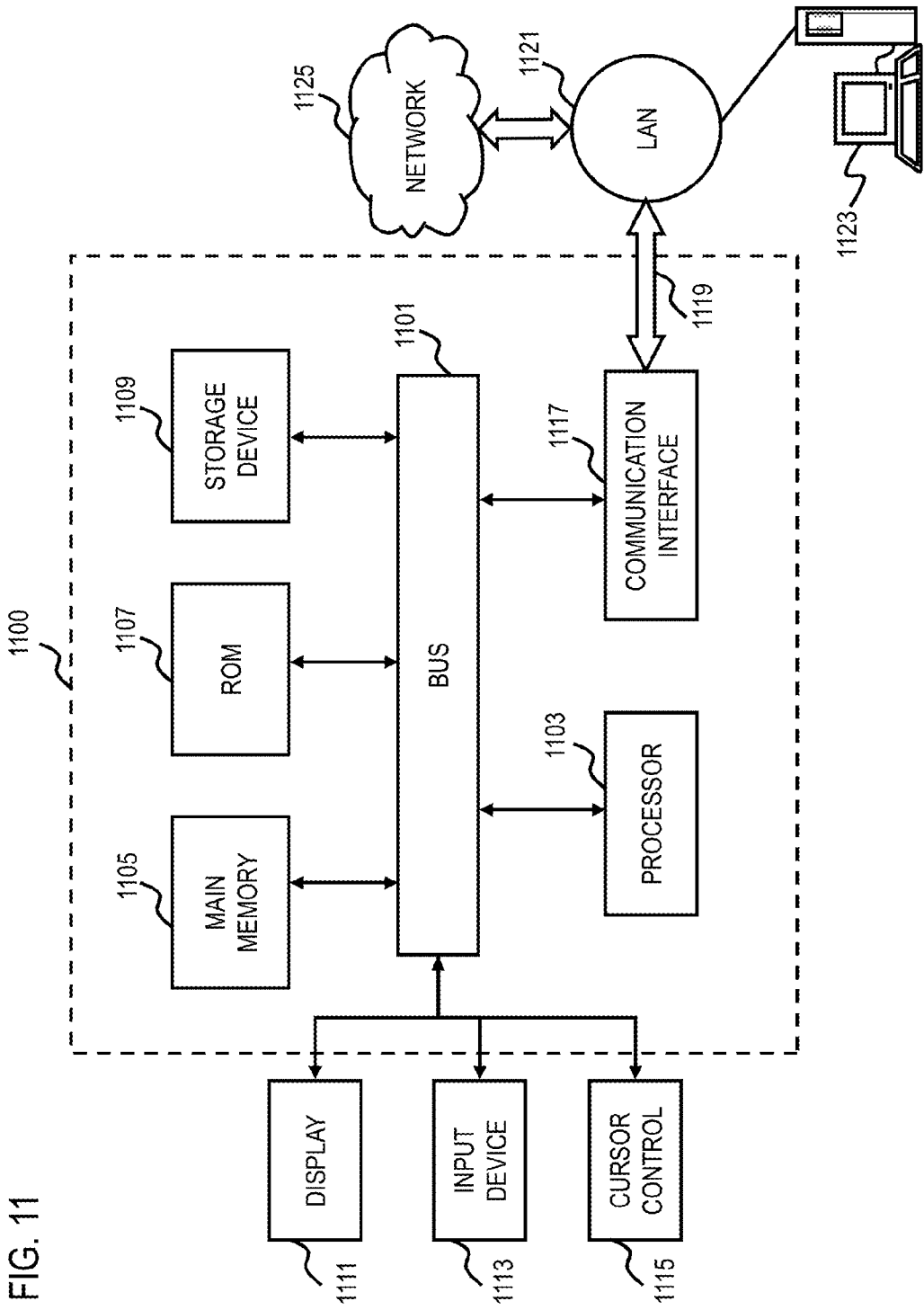
FIG. 11 is a diagram of a computer system that can be used to implement various exemplary embodiments.

FIG. 11 illustrates computing hardware (e.g., computer system) upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as random access memory (RAM) or other dynamic storage device, coupled to the bus 1101 for storing information and instructions to be executed by the processor 1103. Main memory 1105 also can be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
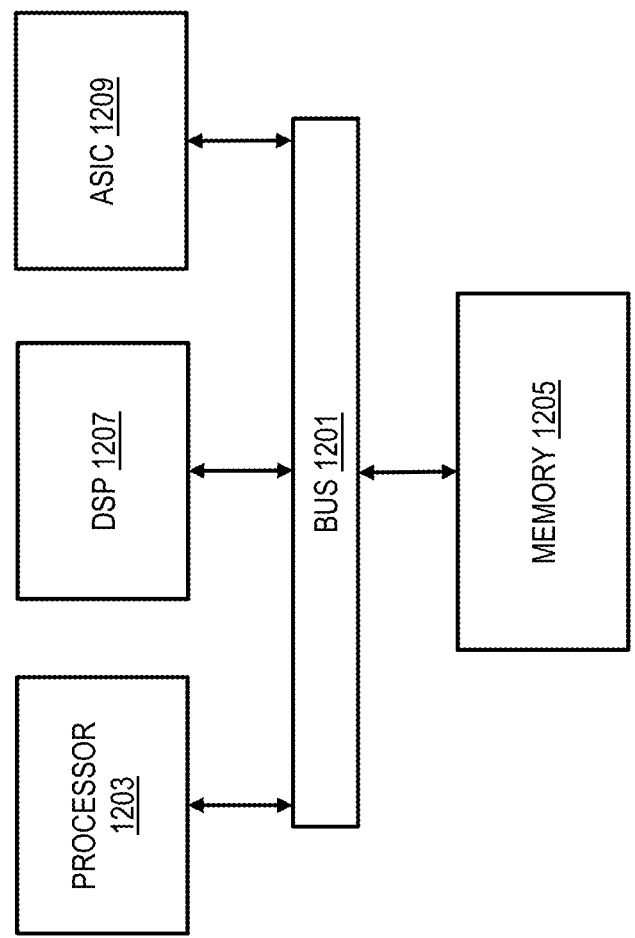
FIG. 12 is a diagram of a chip set that can be used to implement various exemplary embodiments.

FIG. 12 illustrates a chip set 1200 upon which an embodiment of the invention may be implemented. Chip set 1200 is programmed to present a slideshow as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of FIGS. 2-6, and 9A-9C.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1205 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    establishing, by a user device, communications with a set-top box;
    acquiring, by the user device, information about a program being viewed by a user via the set-top box;
    generating a message to provide presence status information to a social network service based on the program information;
    generating another message by the user, via the user device, regarding the program being viewed by the user for posting directly to a messaging log maintained by the set-top box for viewing by a subsequent viewer of the program at the set-top box;
    generating, by the user device, network address information of the user device for sending to the set-top box, wherein the network address information is associated with specific location information for the user device; and
    receiving, by the user device, information relevant to the specific location information for the user device based on the network address information.

2. A method according to claim 1, further comprising:
    determining a plurality of set-top boxes engaged in presentation of the program; and
    dynamically establishing an instant communications session among a plurality of user devices, wherein each of the user devices is configured to interface with the set-top boxes,
    wherein the instant communications session transports information about the program from one of the user devices to another one of the user devices.

3. A method according to claim 2, wherein the instant communications session provides a chat room for the user devices, and the program information includes rating of the program by users of the corresponding user devices.

4. A method according to claim 2, further comprising:
    receiving an advertisement message over the instant communications session, wherein the advertisement is determined based on the program.

5. A method according to claim 1, further comprising:
    generating a request message to request the acquisition of the program information from the set-top box according to a predetermined transmission protocol.

6. A method according to claim 5, wherein the transmission protocol specifies a predefined header of a fixed length, the predefined header including a transport field specifying transport mechanism used for a communication channel between the user device and the set-top box.

7. An apparatus comprising:
    at least one processor; and
    at least one memory including computer program code,
    the at least one memory and the computer program code configured to, with the at least one processor, cause the apparatus to perform at least the following,
        establish, by a user device, communications with a set-top box;
        acquire, by the user device, information about a program being viewed by a user via the set-top box;
        generate a message to provide presence status information to a social network service based on the program information;
        generate another message by the user, via the user device, regarding the program being viewed by the user for posting directly to a messaging log maintained by the set-top box for viewing by a subsequent viewer of the program at the set-top box;
        generate, by the user device, network address information of the user device for sending to the set-top box, wherein the network address information is associated with specific location information for the user device; and
        receive, by the user device, information relevant to the specific location information for the user device based on the network address information.

8. An apparatus according to claim 7, wherein the apparatus is further caused, at least in part, to:
    determine a plurality of set-top boxes engaged in presentation of the program; and
    dynamically establish an instant communications session among a plurality of user devices, wherein each of the user devices is configured to interface with the set-top boxes,
    wherein the instant communications session transports information about the program from one of the user devices to another one of the user devices.

9. An apparatus according to claim 8, wherein the instant communications session provides a chat room for the user devices, and the program information includes rating of the program by users of the corresponding user devices.

10. An apparatus according to claim 8, wherein the apparatus is further caused, at least in part, to:

receive an advertisement message over the instant communications session, wherein the advertisement is determined based on the program.

11. An apparatus according to claim 7, wherein the apparatus is further caused, at least in part, to:
generate a request message to request the acquisition of the program information from the set-top box according to a predetermined transmission protocol.

12. An apparatus according to claim 11, wherein the transmission protocol specifies a predefined header of a fixed length, the predefined header including a transport field specifying transport mechanism used for a communication channel between the user device and the set-top box.

13. A system comprising:
a plurality of set-top-boxes;
wherein one of the plurality of set-top-boxes is configured to:
communicate with a user device,
provide information about a program being viewed by a user via the set-top-box,
receive a message from the user device regarding the program being viewed by the user,
post the message directly to a messaging log maintained by the set-top box for viewing by a subsequent viewer of the program at the set-top box,
receive network address information of the user device, wherein the network address information is associated with specific location information for the user device,
retrieve information relevant to the specific location information for the user device based on the network address information, and
provide the information relevant to the specific location information to the user device.

14. A system according to claim 13, further comprising:
a plurality of user devices, wherein the plurality of set-top-boxes are configured to engage in presentation of the program and to dynamically establish an instant communications session among the plurality of user devices,
wherein each of the plurality of user devices is configured to interface with the plurality of set-top-boxes, and
wherein the instant communications session transports information about the program from one of the plurality of user devices to another one of the plurality of user devices.

15. A system according to claim 14, wherein the instant communications session provides a chat room for the plurality of user devices, and the program information includes rating of the program by users of the corresponding user devices.

16. A system according to claim 14, wherein an advertisement message is provided over the instant communications session to one of the plurality of user devices, and the advertisement is determined based on the program.

17. A system according to claim 13,
wherein the one of the plurality of set-top-boxes is further configured to receive a request message from the user device, and
wherein the request message requests the acquisition of the program information from the one of the plurality of set-top-boxes according to a predetermined transmission protocol.

18. A system according to claim 17, wherein the transmission protocol specifies a predefined header of a fixed length, the predefined header including a transport field specifying transport mechanism used for a communication channel between the user device and the set-top-box.

* * * * *